United States Patent
Narrow et al.

(10) Patent No.: US 10,808,539 B2
(45) Date of Patent: Oct. 20, 2020

(54) ROTOR BLADE FOR A GAS TURBINE ENGINE

(71) Applicant: United Technologies Corporation, Farmington, CT (US)

(72) Inventors: Taryn Narrow, Glastonbury, CT (US); Matthew E. Bintz, West Hartford, CT (US); Lucas D. Sorensen, Middletown, CT (US); Daniel J. Monahan, Cromwell, CT (US); Steven D. Roberts, Moodus, CT (US); Jordan T. Wall, Middletown, CT (US); Yuan Dong, Glastonbury, CT (US); Lisa I. Brilliant, Middletown, CT (US); Andrew J. Murphy, Old Saybrook, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 554 days.

(21) Appl. No.: 15/218,376

(22) Filed: Jul. 25, 2016

(65) Prior Publication Data

US 2018/0023396 A1    Jan. 25, 2018

(51) Int. Cl.
| | |
|---|---|
| *F01D 5/14* | (2006.01) |
| *F04D 29/52* | (2006.01) |
| *F01D 11/12* | (2006.01) |
| *F01D 5/02* | (2006.01) |

(Continued)

(52) U.S. Cl.
CPC .............. *F01D 5/143* (2013.01); *F01D 5/025* (2013.01); *F01D 5/12* (2013.01); *F01D 5/20* (2013.01);

(Continued)

(58) Field of Classification Search
CPC ... F01D 5/025; F01D 5/12; F01D 5/14; F01D 5/141; F01D 5/143; F01D 5/20; F01D 11/08; F01D 11/12; F01D 11/122; F02C 3/04; F04D 29/526; F05D 2220/32; F05D 240/303; F05D 2240/304; F05D 2240/307; F05D 2250/314

(Continued)

(56) References Cited

U.S. PATENT DOCUMENTS

| 3,885,886 A | 5/1975 | Richter |
| 4,671,738 A | 6/1987 | Freeman |

(Continued)

FOREIGN PATENT DOCUMENTS

| EP | 0528138 | 2/1993 |
| EP | 2620654 | 7/2013 |

(Continued)

OTHER PUBLICATIONS

The Extended European Search Report for EP Application No. 17182797.5, dated Nov. 30, 2017.

*Primary Examiner* — Jesse S Bogue
*Assistant Examiner* — Loren C Edwards
(74) *Attorney, Agent, or Firm* — Carlson, Gaskey & Olds, P.C.

(57) ABSTRACT

A rotor blade for a gas turbine engine includes a blade extending from a root and a contoured tip portion at a first end of the blade. The first end is opposite the root. The contoured tip portion includes a first sloped region and a second sloped region. The second sloped region is steeper than the first sloped region, relative to a platform.

14 Claims, 3 Drawing Sheets

(51) Int. Cl.
*F01D 5/12* (2006.01)
*F01D 5/20* (2006.01)
*F02C 3/04* (2006.01)

(52) U.S. Cl.
CPC ............ *F01D 11/12* (2013.01); *F01D 11/122* (2013.01); *F02C 3/04* (2013.01); *F04D 29/526* (2013.01); *F05D 2220/32* (2013.01); *F05D 2240/303* (2013.01); *F05D 2240/304* (2013.01); *F05D 2240/307* (2013.01); *F05D 2250/314* (2013.01)

(58) Field of Classification Search
USPC ........................................................ 60/805
See application file for complete search history.

(56) References Cited

U.S. PATENT DOCUMENTS

| | | | |
|---|---|---|---|
| 4,738,586 A | 4/1988 | Harter | |
| 5,625,958 A * | 5/1997 | DeCoursey | G01B 5/205 33/1 BB |
| 6,142,739 A | 11/2000 | Harvey | |
| 6,338,609 B1 | 1/2002 | Decker et al. | |
| 7,351,039 B2 | 4/2008 | Bachofner et al. | |
| 8,668,459 B2 | 3/2014 | Jan | |
| 2006/0104807 A1* | 5/2006 | Lee | F01D 5/186 415/115 |
| 2012/0328447 A1 | 12/2012 | Hofmann et al. | |
| 2013/0156559 A1 | 6/2013 | Perrot et al. | |
| 2013/0272888 A1* | 10/2013 | Chouhan | F01D 5/225 416/223 R |
| 2015/0377053 A1 | 12/2015 | Mattschas et al. | |

FOREIGN PATENT DOCUMENTS

| | | |
|---|---|---|
| FR | 1218301 | 5/1960 |
| GB | 191210179 | 6/1912 |
| GB | 753561 | 7/1956 |
| GB | 2153918 | 8/1985 |

\* cited by examiner

ROTOR BLADE FOR A GAS TURBINE ENGINE

TECHNICAL FIELD

The present disclosure relates generally to rotor configurations for gas turbine engines, and more specifically to a sculpted shroud pocket and a corresponding rotor blade including a contoured tip.

BACKGROUND

Gas powered turbine engines generally include a compressor section that draws in and compresses air, a combustor section where the compressed air is mixed with a fuel and ignited, and a turbine section across which the resultant combustion products are expanded. The expansion of the combustion products drives the turbine to rotate, which in turn drives rotation of the compressor.

Included within the compressor section, and the turbine section, are multiple rotors. The rotors are driven to rotate by the expansion of combustion products, in the case of the turbine section, or by their connection to a rotating shaft, in the case of the compressor section. As the result of thermal expansion, as well as other factors, during operation, a tip portion of the rotor can rub against a shroud positioned radially outward of the rotor blade. The rotors and shrouds are designed so that this rubbing causes the shroud to wear down with minimal wear on the rotor tip. As a result, it is understood that the rotor tip cuts into the shroud creating a pocket radially outward of the rotor blade.

SUMMARY OF THE INVENTION

In one exemplary embodiment a rotor blade for a gas turbine engine includes a blade extending from a root, a contoured tip portion at a first end of the blade, the first end being opposite the root, the contoured tip portion includes a first sloped region and a second sloped region, and wherein the second sloped region is steeper than the first sloped region, relative to a platform.

In another example of the above described rotor blade for a gas turbine engine the second sloped region is downstream of the first sloped region, relative to an expected fluid flow across the blade in an installed position.

Another example of any of the above described rotor blades for a gas turbine engine further includes a third sloped region downstream of the second sloped region.

In another examples of any of the above described rotor blades for a gas turbine engine the third sloped region has a slope, relative to the platform, approximately equal to the slope of the first sloped region.

In another examples of any of the above described rotor blades for a gas turbine engine the second sloped region is steeper than the first sloped region and the third sloped region.

In another examples of any of the above described rotor blades for a gas turbine engine the third sloped region is steeper than the first slope region.

In another examples of any of the above described rotor blades for a gas turbine engine the contoured tip portion includes an interference zone extending toward the root, and wherein the third slope is at least partially within the interference zone.

In another examples of any of the above described rotor blades for a gas turbine engine the contoured tip portion includes an interference zone extending toward the root, and wherein the third slope is outside of the interference zone.

In another examples of any of the above described rotor blades for a gas turbine engine the contoured tip portion includes an interference zone extending toward the root, and wherein the second slope is at least partially within the interference zone.

In another exemplary embodiment a gas turbine engine includes a compressor section, a combustor connected to the compressor section by a primary flowpath, a turbine section connected to the combustor section by the primary flowpath, a plurality of rotor blades arranged circumferentially about an engine centerline, at least one of the rotor blades including a platform, a root extending radially inward from the platform, and a blade extending radially outward and at least partially spanning the primary flowpath, at least one shroud component radially outward of the plurality of rotor blades, the shroud being abradable relative to the blade, and the blade including a contoured tip portion configured to interfere with the shroud during a rub event, the contoured tip portion including at least a first region and a second region, wherein the first region has a slope approximately equal to a slope of the shroud relative to the engine centerline and a second region downstream of the first region has a substantially steeper slope, relative to the engine centerline.

In another example of the above described gas turbine engine the shroud comprises a sculpted pocket radially outward of the tip portion, the sculpted pocket including a rear facing flowpath step at a forward edge, and a forward facing flowpath turn at an aft edge, wherein the forward facing flowpath turn is less than ninety degrees.

In another example of any of the above described gas turbine engines the tip portion of the rotor blade includes a third sloped region downstream of the second region.

In another example of any of the above described gas turbine engines the third sloped region has a shallower slope, relative to the engine centerline, than the second region.

In another example of any of the above described gas turbine engines the third sloped region has approximately the same slope as the first sloped region, relative to an engine centerline.

In another example of any of the above described gas turbine engines an interference zone extends from a radially outward tip of the rotor blade to position along the third slope, and wherein the interference zone is at least an expected maximum interference between the rotor blade and the shroud during a rub event.

In another example of any of the above described gas turbine engines an interference zone extends from a radially outward tip of the rotor blade to a radially innermost position along the second region, and wherein the interference zone is at least an expected maximum interference between the rotor blade and the shroud during a rub event.

In another example of any of the above described gas turbine engines the shroud includes a sculpted pocket radially outward of the rotor blade, and wherein the sculpted pocket defines a rear facing flowpath step at a forward edge of the sculpted pocket, and a forward facing flowpath bend at a rear edge of the flowpath pocket, and wherein the forward facing flowpath bend induces a flowpath turn of less than 90 degrees.

An exemplary method for operating a compressor includes generating a rear facing flowpath step at a tip clearance using a sculpted pocket, and generating a forward facing flowpath bend at the tip clearance, wherein the forward facing flowpath bend is less than ninety degrees.

Another example of the above described exemplary method for operating a compressor further includes creating the sculpted pocket via rubbing a rotor tip of a compressor rotor against an outer shroud, wherein the rotor tip includes a first sloped region and a second sloped region, and wherein the second sloped region is steeper than the first sloped region, relative to a platform.

In another example of any of the above described exemplary methods for operating a compressor the rotor tip further includes a third sloped region downstream of the second sloped region, and the second sloped region has a steeper slope than the third sloped region.

These and other features of the present invention can be best understood from the following specification and drawings, the following of which is a brief description.

DETAILED DESCRIPTION OF AN EMBODIMENT

Figure 1:
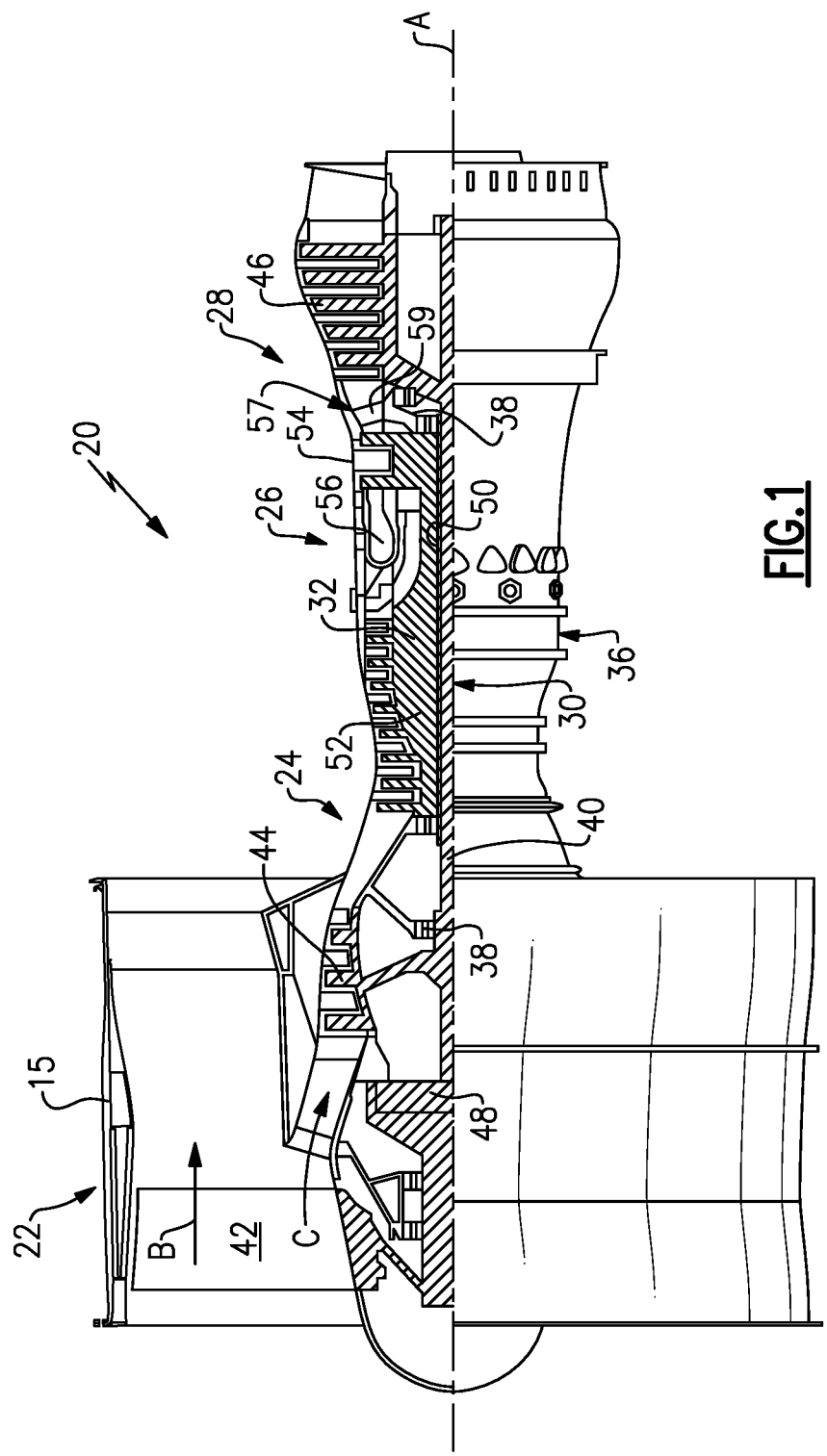
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7° R)]^0.5$. The "Low corrected fan tip speed" as disclosed herein according to one non-limiting embodiment is less than about 1150 ft/second (350.5 m/s).

Gas turbine engines, such as the gas turbine engine 20 described above, utilize rotors within the primary flowpath. The rotors are generally airfoil shaped, including a pressure side and a suction side, and either drive rotation of the shaft in the turbine section, or are driven by rotation of the shaft in the compressor section. The rotors include a blade extending radially outward from a root, with the blade spanning a majority of the primary flowpath. The clearance between the radially outward tip of the rotor and the radially outward portion of the flowpath at the axial position of the rotor is referred to as the tip clearance.

Local variation in tip clearance is caused by a number of practical effects, such as airfoil manufacturing tolerances, engine centerline shift between the rotors and the engine case, case distortions under mechanical and/or thermal loads, and any similar practical realities.

One approach to minimize local high running clearances is to design a compressor rotor and case with a tight (small) clearance, such that rubs between the rotor tip and a radially outward shroud occur during transient processes while the engine is operating. The rub scruffs out material from the shroud due to the tight tolerances, centerline shifts, or any other similar event. As a result of the intentional rubbing, a sculpted pocket with a uniform running clearance is created in the shroud radially outward of the rotor tip. A side effect of utilizing this methodology is that, in some examples, a flowpath step is formed within the shroud at the upstream and downstream ends of the rotor tip. The flowpath step refers to an approximately ninety degree turn in the flowpath into, or out of, the sculpted pocket.

The magnitude of the flowpath step that is created is a function of expected variability based on the above identified factors that would otherwise cause an uneven circumferential clearance distribution and/or the cold assembled clearance. For certain compressor types, the flowpath step can be as large as 1% to 2% of the blade height (span), and the corresponding efficiency penalty can be as high as 0.5%.

Figure 2:
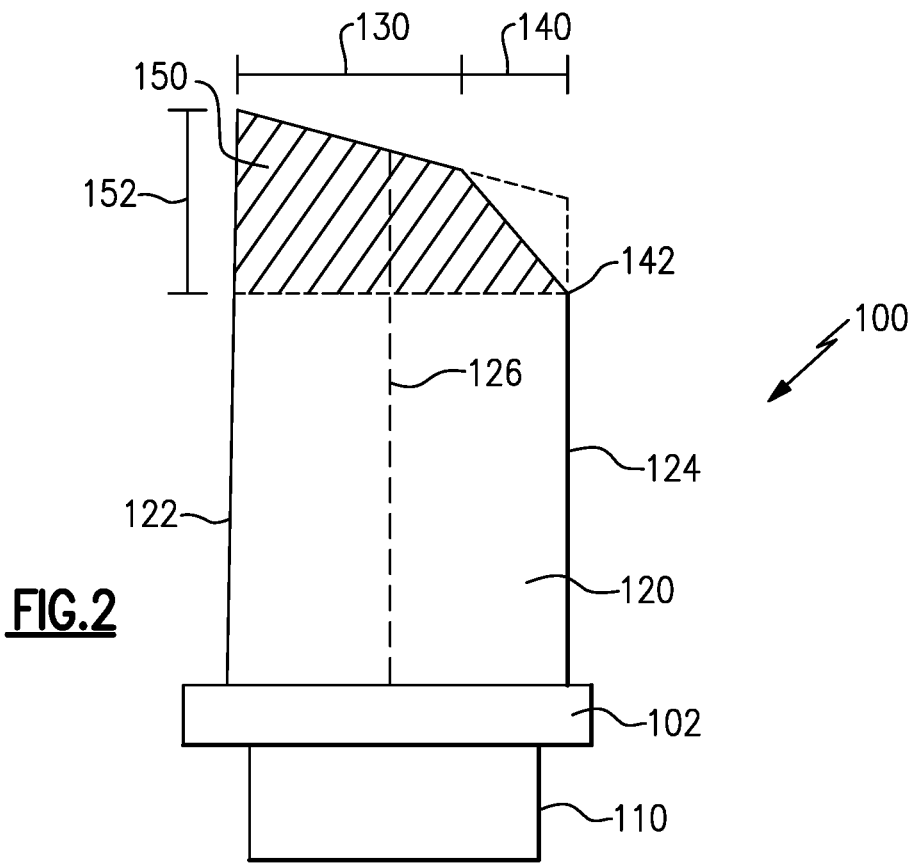
FIG. 2 schematically illustrates a side view of an exemplary rotor.

In order to reduce the impact of the downstream flowpath step, a rotor blade tip including a contoured tip having multiple tip slopes is utilized. With continued reference to FIG. 1, FIG. 2 schematically illustrates an exemplary compressor rotor 100. The exemplary compressor rotor 100 includes a root 110 protruding radially inward from a platform 102 and a rotor blade 120 protruding radially outward from the platform 102. The root 110 interconnects the blade to a rotating shaft using any known configuration. The platform 102 is generally aligned with an expected direction of fluid flow through the primary flowpath, while the compressor rotor 100 is installed.

The rotor blade 120 has a leading edge 122 and a trailing edge 124, with a chord line 126 extending the radial length of the rotor blade 120. A radially outermost tip of the blade 120 is contoured, with the contour being divided into two regions 130, 140. Both regions 130, 140 are sloped relative to an engine centerline of the gas turbine engine including the rotor blade 120. A forward region 130 is closest to the leading edge 122 and has a first slope that approximately tracks the corresponding slope of a shroud, or other outer diameter component, radially outward of the rotor blade 120. While illustrated in FIG. 2 as including a negative slope, one of skill in the art will understand that in some cases the forward region 130 can be approximately parallel to the centerline, and have a slope of zero. An aft region 140 is closest to the trailing edge 124, and has a slope that is different from the slope of the forward region. As can be appreciated from FIG. 2, the second slope is substantially steeper than the first slope.

An interference zone 150 is illustrated via the shaded region of the rotor blade 120. The interference zone 150 extends a radial length 152 into the rotor blade, and represents a maximum expected interference between the rotor blade 120 and an outer diameter shroud during a rub event. The interference zone 150 extends inward to an end 142 of the second region 140 of the contoured blade tip. In alternative examples, the interference zone 150 can extend beyond the end 142 of the second region 140.

Figure 3:
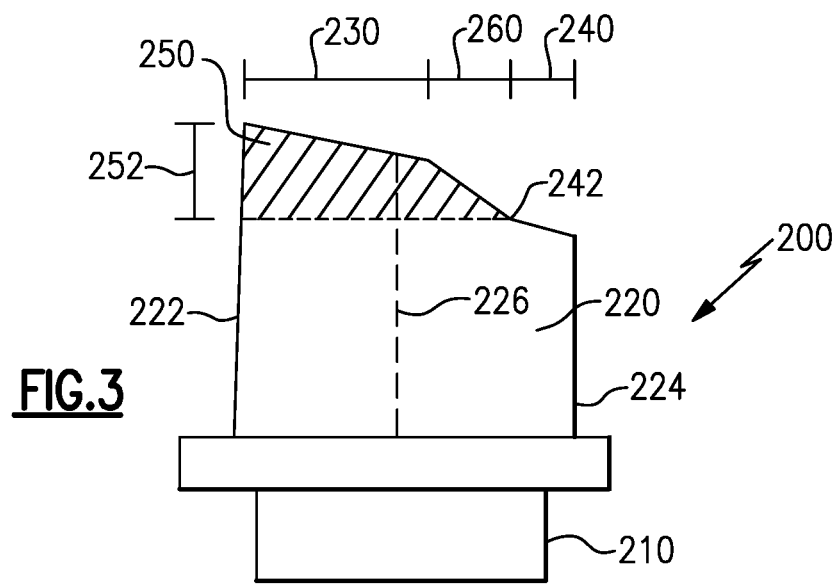
FIG. 3 schematically illustrates a side view of an alternate exemplary rotor.
Figure 4:
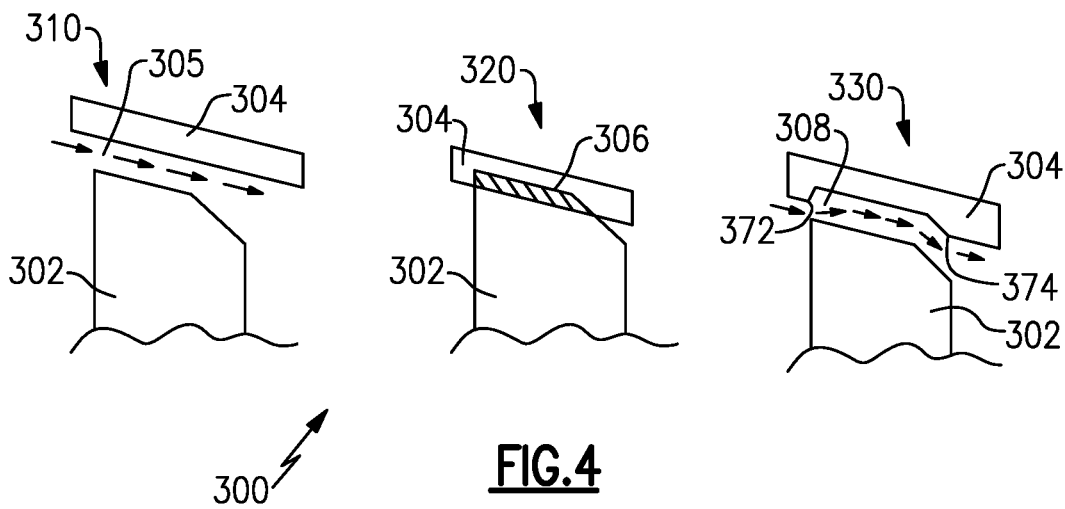
FIG. 4, schematically illustrates a rub event with the exemplary rotor of FIG. 2.
Figure 5:
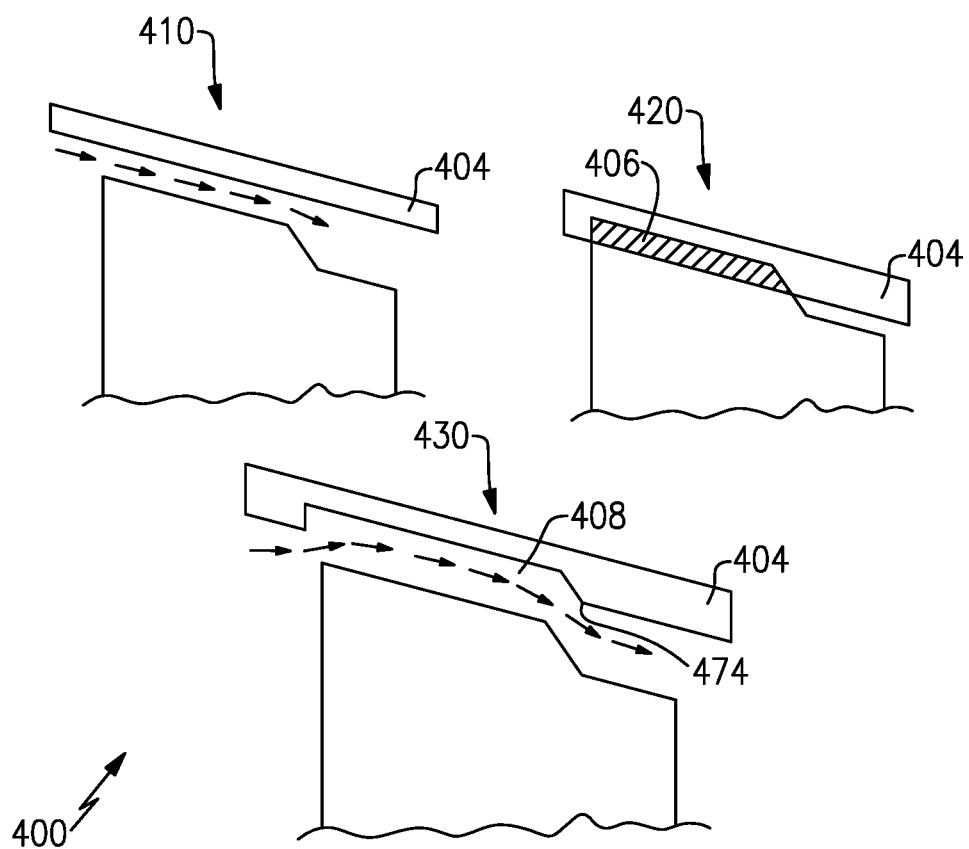
FIG. 5 schematically illustrates a rub event with the alternate exemplary rotor of FIG. 3.

With continued reference to FIGS. 1 and 2, and with like numerals indicating like elements, FIG. 3 illustrates an alternate example rotor 200 including a root 210 with a blade 220 extending radially outward from the root 210. As with the blade 100 of FIG. 2, the blade 4300 of FIG. 3 includes a leading edge 222 and a trailing edge 224, and defines a radial chord length 226.

The radially outermost tip of the blade 220 is contoured and includes multiple regions 230, 240, 260. The example blade of FIG. 3 includes three regions, with the region 230 closest to the leading edge 222 and the region 240 closest to the trailing edge 224 each having a slope that approximately tracks the slope of the radially outward shroud, and an intermediate region 260 having a slope that is substantially steeper than the forward and aft regions 230, 240.

The rotor blade 220 includes a shaded interference zone 250 extends a radial length 252 into the rotor blade, and represents a maximum expected interference between the rotor blade 220 and an outer diameter shroud during a rub event. In the illustrated example of FIG. 3, the interference zone 250 extends radially inwards slightly beyond the aft end 242 of the intermediate region 260, causing the aft most region 240 to rub during a rub event as well. In alternative designs, the interference zone 250 can extend radially inward to approximately the aft end 242 of the intermediate region 260, or slightly before the aft end 242. In the alternate examples, the aft most region 240 will not make contact with an outer shroud during a rub event, and is fully interaction with the outer shroud.

While illustrated in the example of FIG. 3 as having approximately the same slope, one of skill in the art will understand that the foremost region 230 and the aft most region 240 can have varied slopes with only the slope of the foremost region 230 tracking the slope of the radially outward shroud.

With continued reference to FIGS. 1-3, FIG. 4 illustrates a blade/shroud configuration 300 in an initially installed state 310, a rub event state 320 and a post rub event state 330 including a sculpted pocket 308. Prior to the rub event a gap 305 is defined between the radially outermost tip of the blade and 302 and a shroud 304. The gap is referred to as the tip clearance. When a rub event occurs, the blade 302 is shifted radially outward into the shroud 304, and the blade 302 contacts the shroud 304, removing material from the shroud 304. The interference between the blade 302 and the shroud 304 occurs at the interference zone 306.

After the rub event, a sculpted pocket 308 in the shroud 304 remains. The sculpted pocket 308 defines a forward step 372. The forward step is approximately normal to an expected direction of flow through the flowpath, due to the matching of the forward blade tip slope with the slope of the shroud 304. As the aft region of the blade tip has a steeper slope than the forward region, the flowpath bend 374 at the aft end of the opening 308 is substantially shallower than 90 degrees, and does not create a forward facing flowpath step.

With continued reference to FIGS. 1-4, FIG. 5 schematically illustrates a blade/shroud configuration 400 in an initially installed state 410, a rub event state 420 and a post rub event state 430, with the blade tip being generally contoured as illustrated and described in FIG. 3. As with the examples of FIG. 4, the configuration of FIG. 5 results in a sculpted pocket 408 in the shroud 404 having an approximately 90 degree step at the forward edge of the sculpted pocket 408, and a shallow step at the aft edge of the opening 474.

In some examples, the interference zone 406 during the rub event 420 extends almost to the aft end of the intermediate region of the blade tip, as illustrated. In alternative examples, the interference zone 406 can be designed to extend to the axial end of the second region, or partially beyond the axial end of the second region, into the third region.

With reference again to all of FIGS. 1-5, the inclusion of a secondary sloped region within the tip contours, with the second slope being greater than the first slope allows the rub induced sculpted pocket to eliminate or minimize large local clearance variations while simultaneously reducing the penalties associated with a sharp aft flowpath step, such as a 90 degree forward facing flowpath step. At near stalling condition, the dominant driver for clearance vortex is a large pressure difference between the pressure surface and the suction surface at the front (leading edge) portion of an airfoil, such as the rotor blades. By minimizing the running clearance at the front portion, the majority of the benefit from trenching is realized.

At the rear (trailing edge) portion of the airfoil, the diminishing pressure gradient between the pressure surface and the suction surface at the stalling condition means that the pressure gradient has a comparatively low impact on the strength of a clearance vortex, and thus a relatively low impact on the stall margin.

Eliminating the trailing edge flowpath step by intentionally including a larger gap between the rotor tip and the shroud such that rub is avoided in the rear portion of the rotor blade, as is achieved through the contoured tip designs illustrated and discussed herein, the efficiency penalty is minimized with very little stall margin loss due to larger local clearance over the circumference of the shroud. The benefit in efficiency improvement is achieved primarily due to the elimination of the trailing edge flowpath step and the reduced portion of the shroud surface area that experiences rubs during a rub event.

One of skill in the art, having the benefit of this disclosure, will recognize that the relative merits of the various rotor tip designs described above, depend on the specific trade-off between performance, stall margin and manufacturing costs, and can be determined for any given engine design by analysis and validation for a specific compressor configuration.

Further, one of skill in the art, having the benefit of the above disclosure, will understand that while the illustrated examples utilize a constant slope across a given region, some alternate examples may utilize a varied slope across one or more of the regions. By way of example, the rotor tip can be curved in one or more of the regions, with the instantaneous slope of the curve within the regions reflecting the above described characteristics. Further additional regions beyond the exemplary three can be utilized in some examples as well.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotor for a gas turbine engine comprising:
a blade extending from a root;
a contoured tip portion at a first end of the blade, the first end being opposite the rub event;
wherein the contoured tip portion includes a first sloped region and a second sloped region, wherein the second sloped region is steeper than the first sloped region, relative to a platform, wherein the first sloped region is a radially outward facing surface having a constant slope, the contoured tip portion includes an interference zone extending from a radially outward tip of the contoured tip portion to a radially innermost position along the second-sloped region, the interference zone being at least an expected maximum interference of the blade during the rub event.

2. The rotor of claim 1, wherein the second sloped region is downstream of the first sloped region, relative to an expected fluid flow across the blade in an installed position.

3. The rotor of claim 1, further comprising a third sloped region downstream of the second sloped region.

4. The rotor of claim 3, wherein the third sloped region has a slope, relative to the platform, equal to a slope of the first sloped region.

5. The rotor of claim 3, wherein the second sloped region is steeper than the first sloped region and the third sloped region.

6. The rotor of claim 5, wherein the third sloped region is steeper than the first sloped region.

7. The rotor of claim 3, wherein the third sloped region is at least partially within the interference zone.

8. The rotor of claim 3, wherein the third sloped region is outside of the interference zone.

9. A gas turbine engine comprising:
a compressor section;
a combustor section connected to the compressor section by a primary flowpath;
a turbine section connected to the combustor section by the primary flowpath;
a plurality of rotors arranged circumferentially about an engine centerline, at least one of the rotors including a platform, a root extending radially inward from the platform, and a blade extending radially outward and at least partially spanning the primary flowpath;
at least one shroud component radially outward of the plurality of rotors, the at least one shroud being abradable relative to the blade;
the blade including a contoured tip portion configured to interfere with said at least one shroud during a rub event, and the contoured tip portion including an interference zone and a first region and a second region, the interference zone extending from a radially outward tip of the blade to a radially innermost position along the second region, and the interference zone being at least an expected maximum interference between the blade and the at least one shroud during the rub event; and
a slope of the first region being approximately equal to a slope of the shroud relative to the engine centerline and the second region downstream of the first region has a steeper slope, relative to the engine centerline, and wherein the first region has a constant slope.

10. The gas turbine engine of claim 9, wherein the at least one shroud comprises a sculpted pocket radially outward of the tip portion, the sculpted pocket including a rear facing flowpath step at a forward edge, and a forward facing flowpath turn at an aft edge, wherein the forward facing flowpath turn is less than ninety degrees.

11. The gas turbine engine of claim 9, wherein the tip portion of the blade includes a third sloped region downstream of the second region.

12. The gas turbine engine of claim 11, wherein the third sloped region has a shallower slope, relative to the engine centerline, than the second region.

13. The gas turbine engine of claim 12, wherein the third sloped region has the same slope as the first region, relative to the engine centerline.

14. The gas turbine engine of claim 9, wherein the at least one shroud includes a sculpted pocket radially outward of the blade, and wherein the sculpted pocket defines a rear facing flowpath step at a forward edge of the sculpted pocket, and a forward facing flowpath bend at a rear edge of the flowpath pocket, and wherein the forward facing flowpath bend induces a flowpath turn of less than 90 degrees.

* * * * *